US012073466B1

(12) United States Patent
Yadav et al.

(10) Patent No.: US 12,073,466 B1
(45) Date of Patent: Aug. 27, 2024

(54) SYSTEM AND METHOD FOR FRACTIONAL MANAGEMENT OF RESOURCES

(71) Applicant: Morgan Stanley Services Group Inc., New York, NY (US)

(72) Inventors: Ravinder Yadav, Monroe, NJ (US); Ilamurugan Kt, Cumming, GA (US); Neeraj Grover, Edison, NJ (US); Dharam Mehta, Robbinsville, NJ (US); Namrata Rajani, Jersey City, NJ (US)

(73) Assignee: Morgan Stanley Services Group Inc., New York, NY (US)

(*) Notice: Subject to any disclaimer, the term of this patent is extended or adjusted under 35 U.S.C. 154(b) by 0 days.

(21) Appl. No.: 18/422,674

(22) Filed: Jan. 25, 2024

(51) Int. Cl.
*G06Q 40/04* (2012.01)
(52) U.S. Cl.
CPC .................... *G06Q 40/04* (2013.01)
(58) Field of Classification Search
CPC ...................................................... G06Q 40/04
See application file for complete search history.

(56) References Cited

U.S. PATENT DOCUMENTS

| | | | |
|---|---|---|---|
| 8,577,787 | B1 | 11/2013 | Gastineau et al. |
| 11,348,159 | B1 | 5/2022 | Vadaparty et al. |
| 2002/0178105 | A1 | 11/2002 | Levine |
| 2004/0103127 | A1 | 5/2004 | Bjornson et al. |
| 2006/0116944 | A1 | 6/2006 | Perg et al. |
| 2008/0140557 | A1 | 6/2008 | Bowlby et al. |
| 2009/0187468 | A1 | 7/2009 | Krech |
| 2015/0046313 | A1 | 2/2015 | Pantelis |
| 2016/0358260 | A1 | 12/2016 | Banner et al. |
| 2019/0026830 | A1 | 1/2019 | Powell |
| 2020/0050395 | A1 * | 2/2020 | Bavishi ................. G06F 3/0611 |

(Continued)

FOREIGN PATENT DOCUMENTS

| CA | 3063096 A1 * | 11/2018 | ......... G06Q 30/0283 |
|---|---|---|---|
| WO | WO-2014160106 A1 * | 10/2014 | ............. G06Q 30/08 |

OTHER PUBLICATIONS

Datell: Do You Really Nee a Message Queue Like Kafka or Pulsar? Dec. 2023, pp. 1-7 (Year: 2023).*

(Continued)

*Primary Examiner* — Bijendra K Shrestha
(74) *Attorney, Agent, or Firm* — PEARL COHEN ZEDEK LATZER BARATZ LLP

(57) ABSTRACT

A computerized system and method may be used for exchanging data over a communication network, for example based on network requests specifying inventory items in fractional amounts. A computerized system including one or more processors, a memory, and a communication interface to communicate via a communication network with remote computing devices, may be used for automatically organizing network requests in a queue; assigning a priority to one or more of the requests based on request types; tracking an auxiliary database, which may include comparing a request amount to a value in the auxiliary database, where the value may be reserved based on the priority of the request; and attempting the executing of requests based on the tracking of the auxiliary database and/or based on the queue. Some embodiments may be used as a standardized framework for fractional inventory management to be used, e.g., in cloud computing and/or fractional trading platforms.

17 Claims, 9 Drawing Sheets

(56) References Cited

U.S. PATENT DOCUMENTS

2020/0234372 A1 7/2020 Starr et al.
2022/0366425 A1* 11/2022 Anasta .................. H04L 67/535

OTHER PUBLICATIONS

Asgari et al.: Building Quality-of-Service Monitoring for Traffic Engineering and Service Management, Dec. 2003, Journal of Networkand Systems Management, vol. 11, No. 4, pp. 399-426. (Year: 2003).*

* cited by examiner

SYSTEM AND METHOD FOR FRACTIONAL MANAGEMENT OF RESOURCES

FIELD OF THE INVENTION

The invention described herein relates to the field of resource management and optimization. Some embodiments of the invention may relate more particularly to the field of exchanging or creating data describing fractional trading of assets, or to managing computer resources in fractional quantities.

BACKGROUND OF THE INVENTION

Accessing or owning some entities, such as a high-performance-computation cluster, may be of interest as having resources suitable for performing a given computer task, yet the cluster as a whole may be large, and thus using it in its entirety for the task at hand would result in wasting great amounts of computer resources and power. In another arena, traditional inventory management, such as for example trading in traditional financial markets, often requires investors to purchase whole units of financial assets, which may entail various shortcomings. For example, whole units of some entities, such as computing resources, financial assets, and non-financial resources, may be prohibitively expensive for some individuals or users: high-value shares, such as those of well-established companies, may have share prices that are beyond the reach of many investors. As a result, some users may often be excluded from participating and using such assets, which may limit the range of their opportunities, options, capabilities, and capacities.

Some trading systems and approaches allow trading of fractions of assets using an intermediary component, often in the form of an inventory management or brokerage platform. This intermediary acts as a bridge between users and the platforms offering the relevant assets, enabling the execution of fractional trades, or of performing fractioned transactions, by purchasing whole units of assets and dividing them into parts which may be assigned or attributed to different parties of interest. For instance, if an investor wishes to buy a fraction of a high-priced share, the financial intermediary may handle the fractionalization process, allowing the investor to own a portion of the asset commensurate with their investment amount.

Embedding an intermediary-based "fractional trading" system within state-of-the-art computer-based trading infrastructures, however, entails a great variety of technological challenges. For example, such fractional trading systems may be required to be easily integrated with, or embedded within, an intricate network of existing trading platforms and/or infrastructures that do not, on their own, support fractional trading, or performing transactions in fractional quantities. Such systems may also be required to include or involve complex order or transaction execution algorithms in order to automatically orchestrate or coordinate a plurality of actions among a plurality of interconnected platforms and/or computer systems—as well as to offer account management systems which may track the value of traded resources, provide real time and/or transaction history information from the multiple interconnected platforms or systems, as well as provide additional tools required for enabling an inventory management system to be efficient and scalable for a great amount users and a corresponding great amount of automated computer actions required for carrying out all relevant transactions in a reliable and robust manner.

SUMMARY OF THE INVENTION

A computerized system and method may be used as a standardized framework for exchanging data over a communication network, for example based on network requests specifying inventory items in fractional amounts.

Some embodiments of the invention may include computerized system including one or more processors, a memory, and a communication interface to communicate via a communication network with remote computing devices, which may be used for automatically organizing or ordering network requests in a queue—where requests may, e.g., be received over a communication network from remote requester computer systems; where requests may include data structures and/or tables such as further described herein; and where the organizing may include, e.g., assigning a priority or priority value to one or more of the requests based on request types. Some embodiments may track a database, which may include or involve comparing a request amount, or an amount specified or associated with a network request, to a value in the database, where the value may be reserved, for example, based on the priority of the request. Some embodiments of the invention may attempt executing requests based on the tracking of the database and/or based on the queue and/or based on additional parameters (such as for example predetermined time periods and/or thresholds for executing requests).

Some embodiments of the invention may be used as a standardized framework for fractional inventory management to be used, e.g., in cloud computing and/or fractional trading platforms.

Some embodiments of the invention may perform or execute different automated computer actions and/or network transactions, such as for example transmitting or receiving data items over the network from a plurality of remote computers (which may, in some embodiments, be associated with liquidations and/or replenishments of inventory items such as, e.g., described herein), and/or transmitting notifications to remote computer systems and/or updating databases and/or data structures, e.g., based on the executing of requests and/or data transfers such as for example described herein.

The systems and methods provided by some embodiments of the invention may be suitable for handling requests of inventory items in fractional amounts in a transparent manner, e.g., where at least some remote computer systems may not be aware of any network transactions associated with fractional amounts of inventory items (e.g., as opposed to whole units of such items).

In some embodiments, a dedicated framework for network or action request files or data items, and/or for queuing and prioritizing events, actions, network requests or commands, may include using Apache Kafka topics with multiple partitions such as for example described herein.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
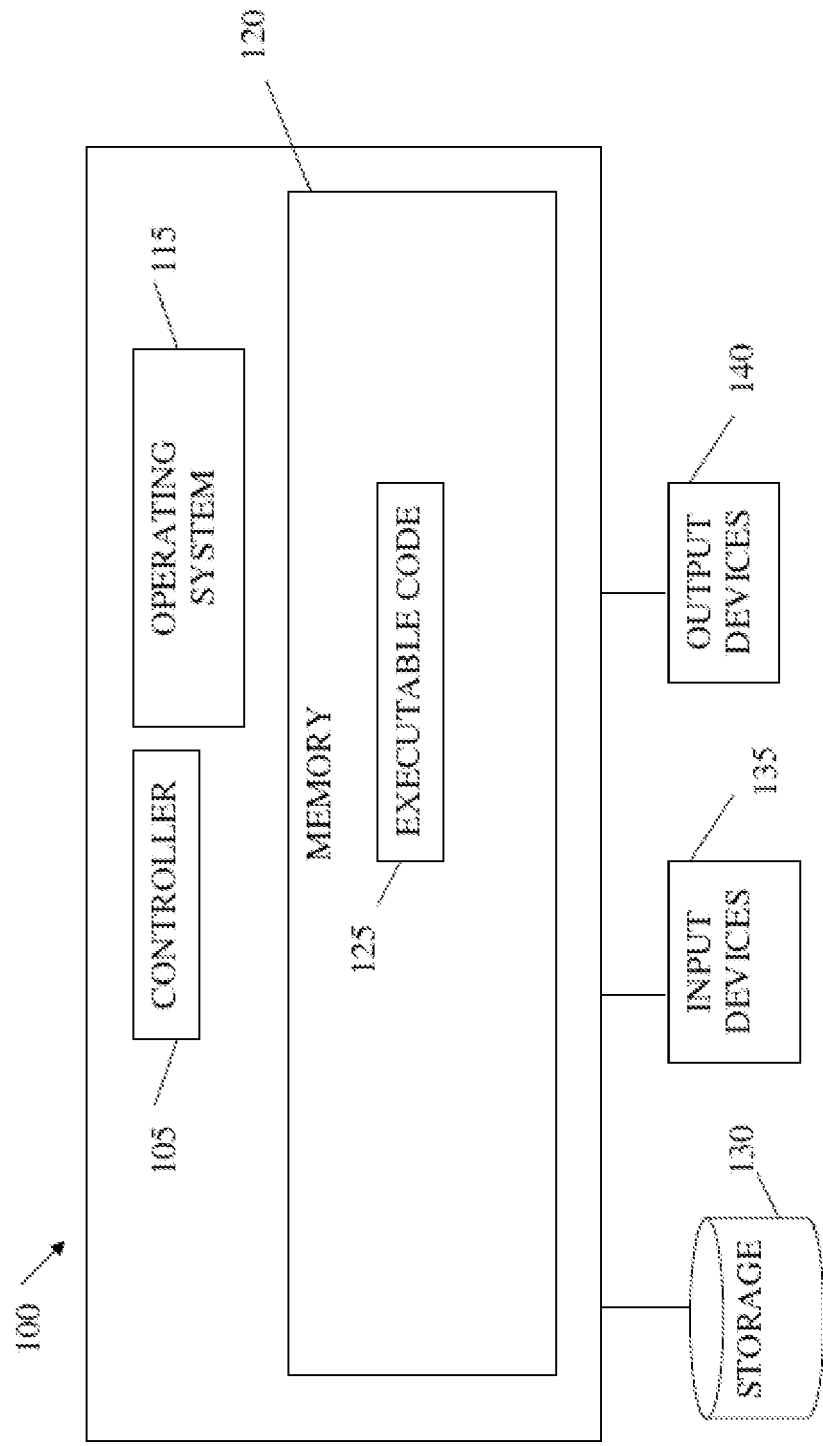
FIG. 1 is a high-level block diagram of an exemplary computing device which may be used with embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention may be used as a standardized platform, component, or framework for fractional inventory management to be used, e.g., as part of cloud computing and/or fractional trading systems and platforms. Some embodiments may provide a computerized system including, e.g., one or more processors, a memory, and a communication interface to communicate via a communication network with remote computing devices, which may be used for automatically organizing network requests in a queue; assigning a priority to one or more of the requests based on request types; tracking an auxiliary database, which may for example include comparing a request amount to a value in the auxiliary database, where, e.g., the value may be reserved based on the priority of the request; and attempting the executing of requests based on the tracking of the auxiliary database and/or based on the queue—such as for example further described herein.

Some example embodiments may provide a centralized fractional management of resources or trading system and method which may allow, for example, to automatically trade in fractional quantities (e.g., seamlessly or transparently—and allowing at least some elements in the computer environment to be agnostic to computer actions or transactions including fractional quantities)—for example using multiple channels and/or allowing connectivity and/or integration with a plurality of different trading systems or platforms and using, for example, both principal and/or agency trading frameworks (e.g., simultaneously, or in parallel).

As used herein, a "trade-along" feature or capability may describe integrating, trading, or transferring data automatically, seamlessly and/or transparently—which may refer to a system operating, e.g., in a manner agnostic to, or independent form, additional platforms or systems being integrated into it, and/or their specific architecture or technical specifications (e.g., not requiring further modification, or requiring minimal modifications for compatibility with any particular platform and/or depending on the trading model used)—as provided by some embodiments of the invention and as further discussed herein.

Freeing users, resource providers, and the like, of restrictions relating to trading in whole units, embodiments of the invention may improve technology by supporting a higher throughput of resource management or trading requests or transactions, as well as provide trade along capabilities which may be able to handle, sustain or support a large number of network requests and/or network transactions or trades, while providing or performing quick responses or automated actions (e.g., within sub-seconds from the receiving of a request). In addition, some embodiments of the invention may provide "Plug-n-Play" features, which may be or may include a standardized framework and interface integrable and compatible, to allow managing or controlling a plurality of different trading systems or platforms, and/or to integrate and provide fractional trading capabilities such as, e.g., described herein.

In some embodiments, seamless integration of trading systems or components, and a corresponding trade along capability may include, for example, using a message queue interface (MQ), a Kafka interface, or a representational state transfer (REST) interface or application programming interface (API), e.g., to ensure desirable processing or computer actions, transactions, or events, according to priorities such as for example described herein.

It should be emphasized that while some embodiments of the invention are discussed or considered herein as relating to fractional trading of financial assets, different embodiments of the invention may generally be used for exchanges of data tasks in a variety of technological environments. For example, some embodiments of the invention may be applied, e.g., to network transactions, or to exchanges of data over a communication network which may relate to managing or optimizing limited computer resources according to varying needs and constraints, such as for example usage of processing and/or memory units in a cloud platform (such as for example an infrastructure-as-a-service or IaaS platform) to perform or execute a plurality of computer tasks requested by a plurality of different users. Thus, discussions relating to, e.g., fractional "trading" of financial assets, should be considered non-limiting—as they may be applied to, e.g., requesting and/or carrying out computer tasks by a part or fraction of a computer resource (such as, e.g., part of a high-performance cluster component offered via a cloud platform).

Accordingly, "orders" or "transactions" as used herein (which may for example describe executing finance-related automated computer actions in some non-limiting embodiments) may refer more generally to network transactions, and/or to commands or requests for performing computer tasks—e.g., by a computerized system remote and physically separate from a requesting computerized system, which may include or involve exchanging data over a communication network—such as, e.g., described herein. A person skilled in the arts of computer resource management would recognize that terms such as "inventory", "positions", "shares" and the like, should be considered as being applied to analogous entities, e.g., terms such as, e.g., "idle/busy/unavailable", "total CPU cores used", "CPU cores in cluster or machine X", "Memory cells in cluster or machine Y", and their equivalents. In this context, a "request" or "command" may be or may include data structures such as for example a table, a text file, a graph database, and the like—which may be human readable or human unreadable—to specify for example particular computer tasks and their order of execution. Many additional or alternative formats for computer or network requests and commands are known in the relevant arts.

As used herein, "users", "consumers", and the like, may refer to entities sending orders and/or requests and/or commands to be managed by embodiments of the invention. In some embodiments, users may be or may include computer systems being physically separate and remote from the computerized system or the plurality of systems carrying out some or all of the protocols and procedures described herein. Users or user accounts may be associated with inventory items, which may reflect for example ownership over associated items and/or a capability or capacity to send commands and/or requests for example in order to manage the items using automated actions by embodiments of the invention as further described herein. An associated of, e.g., an inventory item with a user may be reflected or documented in appropriate data structures such as for example described herein.

As used herein, an "inventory item" may be any object or item of a given type managed or maintained by embodiments of the invention. For example, some embodiments of the invention may manage, e.g., computational resources, shares (as well as, e.g., "stocks" in some example embodiments), and/or additional or alternative types or limited resources. Non-limiting examples of inventory items may be, e.g., "Teska Inc." stocks, AMD processing cores of a given type, and the like. As used herein "inventory" may refer to a plurality of inventory items held or managed by embodiments of the invention. For example, embodiments of the invention may include an inventory of, e.g., 7 individual shares of "Teska Inc." stock at a given point in time, where each one of the 7 shares may be associated with, or assigned to, a different user among a plurality of users (e.g., share 1 of stock X is associated with user A; share 2 with user B, and so forth).

Some embodiments of the invention may include or involve maintaining a single inventory or inventory account: in such manner, embodiments may include a single and centralized inventory account to manage and/or track transactions and/or orders from a plurality of users and/or across a plurality of different channels (which may for example refer to different platforms and/or networks using which requests and/or orders and/or transactions may be received and/or executed), such as for example further described herein.

As used herein, a "position" or "position value" may be, may include, or may represent an overall quantity of an inventory item, or a type of an inventory item held, kept or managed by embodiments of the invention. For example, embodiments may hold a position of 7 "Teska Inc." shares or stocks, or a position of 213 total shares or stocks (including, e.g., shares or stocks of different companies), or a position of 718 CPU cores (where cores are, e.g., included in different servers or computer clusters), and the like. In some embodiments, a position may indicate, reflect, or measure the weight of investment, or the market or risk exposure for a given inventory item or item type. For example, a position of 12 associated with stocks, and a position of 21 associated with government bonds at a given point in type, may indicate that embodiments of the invention may be currently managing more government bonds than stocks (e.g., since 21>12), and may be accordingly more exposed to risks associated with stocks (such as for example market fluctuations) than to risks associated with bonds. It should be noted that in some embodiments a position may not match the actual number of inventory items which may be represented by it. For example, a position of 7 may represent or describe 12 stocks in the inventory held by some embodiments of the invention at a given point in time. A negative position value may be referred to herein as the position "going short".

FIG. 1 shows a high-level block diagram of an exemplary computing device which may be used with embodiments of the invention. Computing device 100 may include a controller or processor 105 (or, in some embodiments, a plurality of processors) that may be, for example, a central processing unit processor (CPU), a chip or any suitable computing or computational device, an operating system 115, a memory 120, a storage 130, input devices 135 and output devices 140 such as a computer display or monitor displaying for example a computer desktop system. Each of the procedures and/or calculations discussed herein, and the modules and units discussed, such as for example those included in FIGS. 2-8, may be or include, or may be executed by, a computing device such as included in FIG. 1, although various units among these modules may be combined into one computing device.

Operating system 115 may be or may include any code segment designed and/or configured to perform tasks involving coordination, scheduling, arbitration, supervising, controlling or otherwise managing operation of computing device 100, for example, scheduling execution of programs. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions (e.g. code 125) to carry out a method as disclosed herein, and/or a data store of a plurality of data items describing one or more remote computing devices as further disclosed herein.

Executable code 125 may be any executable code, e.g., an application, a program, a process, task or script. Executable code 125 may be executed by controller 105 possibly under control of operating system 115. For example, executable code 125 may be one or more applications performing methods as disclosed herein, for example those of FIGS. 2-8 according to embodiments of the invention. In some embodiments, more than one computing device 100 or components of device 100 may be used for multiple functions described herein. For the various functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data describing one or more remote computing devices, as well as additional and/or different data items, may be stored in a storage 130 and may be loaded from storage 130 into a memory 120 where it may be processed by controller 105. In some embodiments, some of the components shown in FIG. 1 may be omitted.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out functions, methods and procedures as disclosed herein.

It should be noted that a plurality of physically separate computer systems and/or computational resources which may or may not correspond to the architecture of system 100 (and may include for example ones provided via cloud platforms and/or services) may be for example connected via a data or communication network as a multi-memory and/or processor system, which may be used in some embodiments of the invention. Those skilled in the art may recognize that a plurality of computer system architectures may be used in different embodiments of the invention.

Figure 2:
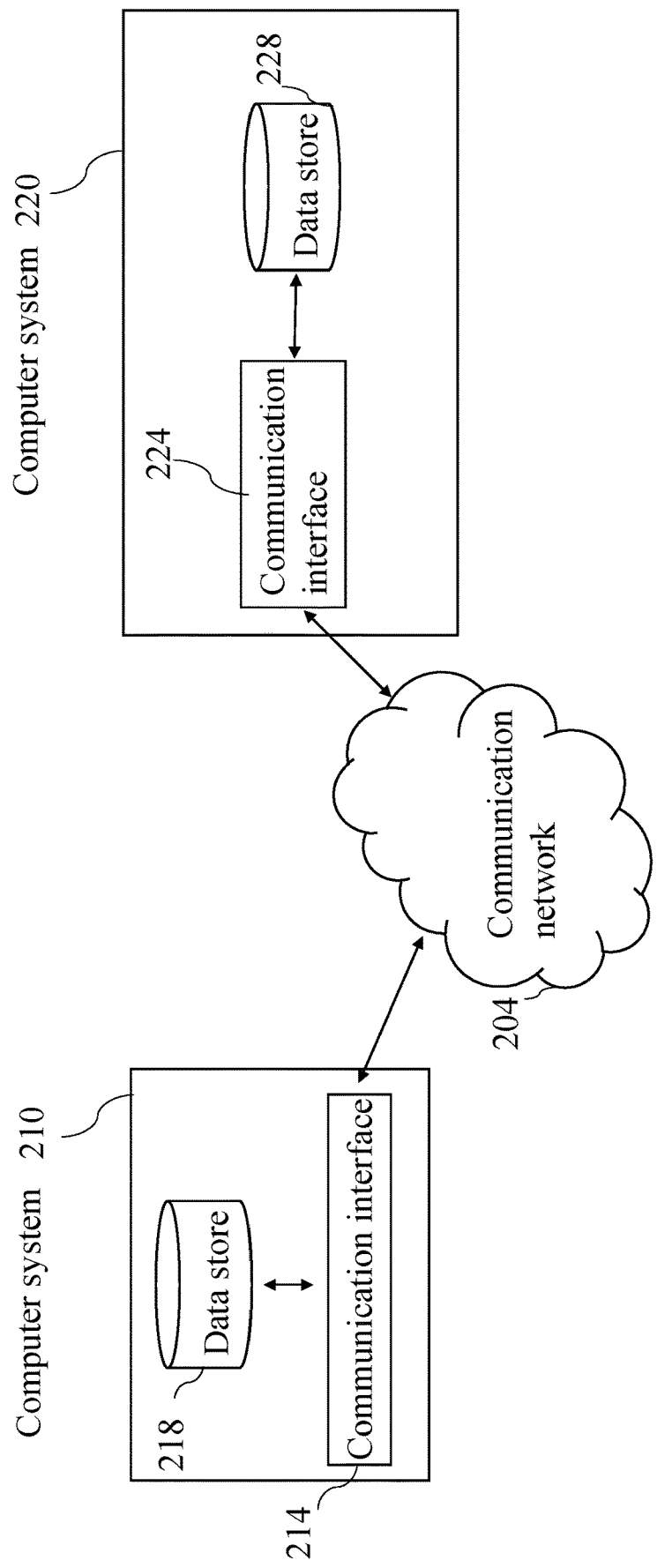
FIG. 2 shows example computer systems remotely connected by a data network according to some embodiments of the invention.

FIG. 2 shows example computer systems remotely connected by a data or communication network according to some embodiments of the invention. Remote computer 210 (e.g., a user, resource provider, or broker server computer, and the like, as described herein) may send or transmit, over communication or data network 204, data items such as for example action and transaction requests or commands—to computerized system 220. Each of systems 210 and 220 may be or may include the various components described with reference to system 100, as well as other computer systems, and include and/or operate or perform, e.g., the various corresponding protocols and procedures described herein. In some embodiments, computerized systems 210 and 220 may additionally perform a plurality of operations including for example sending and/or transmitting and/or collecting and/or receiving additional data to or from additional remote computers systems. One skilled in the art may recognize that additional and/or alternative remote and/or computerized systems and/or network and connectivity types may be included in different embodiments of the invention.

In some embodiments of the invention, computer systems 210 and 220 may communicate via data or communication or data network 214 via appropriate communication interfaces 214 and 224, respectively—which may be for example NICs or network adapters as known in the art. As discussed herein, receiver and sender computers such as, e.g., computer systems 210 and 220 may send or transmit data items using appropriate network communication protocols such as for example Realtime Transport Protocol (RTP) and/or Real Time Streaming Protocol (RTSP) and/or Transmission Control Protocol (TCP)—although other network and/or data packet communication protocols known in the art may be used in different embodiments. Computerized systems 210 and/or 220 may include data stores such as, e.g., 218 and 228 which may for example include a plurality of received data items, such as for example action or transactions commands, messages, or requests as further described herein.

The plurality of computer systems used in different embodiments of the invention may, in some embodiments of the invention, use or support encrypted and non-encrypted communication (such as for example HTTP, HTTPS, WebSocket, and the like, which may include or involve, e.g., the use of appropriate hash functions), or a combination of encrypted and non-encrypted communication protocols using, e.g., a plurality of communication channels, networks, and/or threads.

Embodiments of the invention may perform or execute a plurality of automated computer actions, requests and/or network transactions, e.g., as part of inventory management protocols and procedures such as for example described herein. Some example automated actions or requests to be executed are described herein and may include, for example, sending or transmitting data items (which may include requests and commands such as described herein, e.g., to execute orders or transactions) across one or more communication networks. In some embodiments of the invention, automated actions may be included in appropriate requests—and embodiments of the invention may perform or execute the action requested or included in corresponding data items such as a request or command, e.g., by a user, such as for example described herein. Additional or alternative types of automated computer actions may be used in different embodiments of the invention.

As used herein, a "buy" action or request may refer to an automated computer action of associating an inventory item, or an item included in an inventory, with a user. For example, embodiments may receive a request from a user to buy 1 share of Teska Inc. stock. Embodiments may then automatically associate 1 share of Teska Inc. included in the inventory with the requesting user.

As used herein, a "sell" action or request may refer to an automated computer action of de-associating, or of removing an association of an inventory item with a user. For example, embodiments may receive a request from a user to sell a share of Teska Inc. currently associated with that user. Embodiments may then automatically remove the association of 1 Teska Inc. with the requesting user.

As used herein, a "replenishment" action or request may refer to an automated computer action of acquiring or adding an additional resource (e.g., which has so far not been managed by the system) to the inventory. For example, at a given moment where, all inventory of Teska Inc. shares are already associated with users, and a given user requests an additional unit or fraction of an item A, embodiments may automatically send or transmit and/or execute a replenishment order, request, or command, e.g., for acquiring more share of Teska Inc. from a remote broker server which may then be provided or associated with the requesting user.

As used herein, a "liquidation" action or request may refer to an automated computer action of removing a resource (e.g., which has so been managed by the system) from the inventory. For example, at a given moment where, a share of Teska Inc. is not associated with any user, embodiments may automatically send or transmit and/or execute a liquidation order, request, or command, e.g., for selling more shares of Teska Inc. back to a broker server.

In some embodiments of the invention, buy and sell actions and requests may include fractional quantities—while replenishments and liquidation actions may be performed only in whole, discrete units, for example to support fractional trading even if resource provider or broker server systems do not support providing resources in fractional quantities.

As used herein, an "inventory check" (or "position check") may refer to the looking up or monitoring of an inventory item or a plurality of items (or a position item or database such as described herein) by embodiments of the invention, and/or to returning a relevant or requested value as an output (which may for example be part of an order management algorithm or procedure such as for example described herein). Inventory (or position) checks may be associated with different actions, commands or requests. For example, an inventory (or position) check may be associated with a "sell" action or request (which may be referred to as a "sell inventory check" herein), or with a "buy" action or request (e.g., a "buy inventory check").

As used herein, a "reserve" action may refer to selecting an inventory item for the execution of a corresponding computer action or transaction. For example, upon receipt of a sell request from a user for a bond or share X, embodiments may select a particular share X currently associated with the requesting user, and sell it to another, different user. Reserving actions may be performed, in some embodiments, for a plurality of different computer actions, such as buy, sell, liquidation, replenishment, and the like—and may be reflected or documented in appropriate data structures such as for example described herein.

Some embodiments of the invention may automatically process, perform, or execute computer actions such as for example carry out sell, buy, replenishment, and liquidation actions or transactions. Some embodiments of the invention may have an inbuilt capability to automatically buy or sell items or shares among individual users or accounts of users, and/or from the inventory into the market, e.g., based on priorities and/or thresholds, as further demonstrated herein. Embodiments may sort or organize, document or describe a plurality of automated computer actions, and/or requests for automated actions, and/or executions of such actions, in appropriate data structures and dedicated components such as for example further described herein.

The various computer actions or transactions described herein may include, or may be performed by monitoring, looking up, changing, updating, writing, or outputting data structures describing inventory items and/or computer actions or transactions, such as for example data structures described herein.

It should be noted that additional or alternative computer actions, such as for example calculating a position value based on the inventory items (which may, e.g., include or involve counting inventory items of different types and/or looking up data items and/or tables such as provided herein), saving a position value or inventory item to a database in computer memory, reserving inventory items, e.g., for requested computer actions or transactions, and the like, may be included and/or performed by different embodiments of the invention.

In some embodiments, performing or executing actions or transactions such as further described herein may for example include some or all of: sending or transmitting one or more data items to a plurality of remote computer systems; receiving one or more data items from a plurality of remote computer systems; updating relevant data structures in one or more computer systems (such as for example the data structure described herein), and the like. Data items sent or received may be or may include for example requests or commands for automatically executing one or more computer operations by embodiments of the invention and/ or by one or more remote computers, as known in the relevant arts and, e.g., in accordance with the procedures and protocols described herein.

Some nonlimiting example data structures or databases described herein may, e.g., be and/or describe and/or include a plurality of computer actions and/or transactions and/or requests and/or commands such as for example described herein—and may be integrated, e.g., using structured query language (SQL) environments (e.g., the various datasets or databases described herein may be SQL databases). One skilled in the relevant art would recognize, however, that different data structures and corresponding environments may be used in different embodiments of the invention.

As further described herein, sell orders, requests, or commands, and the like—which may be referred to more generally as "events" for example in queuing and prioritizing contexts—may be included or stored, and/or monitored or tracked in dedicated databases. In one nonlimiting example, and as further discussed herein, if a position quantity or value in the inventory is not sufficient for performing a given computer action—such as for example a sell action—some embodiments may automatically create a replenishment order and may monitor or track it against the respective sell orders, e.g., using an order replenish database or map table. An example order replenish database entry or record (representing for example a single action or transaction) is provided in Table 1:

TABLE 1

| Variable | Datatype | Example | Description |
| --- | --- | --- | --- |
| DT2_TRD | Date | 2023-11-15 | Trade Date |
| IDN_PKG | Char | SMA-2023-11-15-13.39.15.055909 | A "package" id of the sell order (e.g., if orders are executed in batches or packages) |

TABLE 1-continued

| Variable | Datatype | Example | Description |
|---|---|---|---|
| IDN_ORD | BigInt | 6473690 | Order id of the sell order |
| IDN_LAST_REPLENISH | Varchar | FTM_6473686_931 | Replenishment order id for the respective sell order |
| TMS_UPDT | Datetime2 | 2023-11-15 13:39:15.7633333 | Last time the record was updated |
| IDN_UPDT_USER | Char | FTM | Name or ID of the updating system/user |
| IDN_UPDT_PGM | Varchar | P_FTM_ACCT_POS_SAVE-E | Updating program |

In some embodiments, request, transaction or order messages may update or be included in a corresponding order summary table—which may be used, e.g., for describing an order or transaction among a plurality of orders or transactions managed using different embodiments of the invention. An example order summary table, entry or record is provided in Table 2:

TABLE 2

| Variable | Datatype | Example | Description |
|---|---|---|---|
| PackageID | Char(30) | SMA-2023-11-15-13.39.15.055909 | Package id of the order (e.g., if orders are executed in batches or packages) |
| OrderID | BigInt | 6473690 | Order id of the order |
| Trade Date | Date | 2023-11-15 | Trade Date |
| Security Code | Char(9) | 0000DF6U1 | Identifier of the traded security or item |
| Order Status Code | Char(6) | EXEC | Order status code - e.g., SENT for new order sent for execution (but not yet executed), EXEC for executed order, REJECT for rejected order, CANCEL for cancelled order, ACK for acknowledged order and EXINP for partially executed order |
| BuySell Code | Char | S | Trade type code - e.g., B for Buy order and S for Sell order |
| Number of Shares | Decimal | 0.252 | Number of shares (which may be fractional) |
| Create User ID | Char(8) | SMA | identifier for system/user creating the order/record |
| Create Time | DateTime | 2023-11-15 13:39:15.6266667 | Time of creating the order |
| Update Time | DateTime | 2023-11-15 13:39:20.2000000 | Time of updating the order/record |
| Update User ID | Char(8) | SMA | Identifier for system/user updating the order/record |
| Account ID | Char(26) | 2002-02-14-21.57.17.675394 | Inventory or account id |

In some embodiments, executions of transaction or orders may be updated or be documented in a corresponding order execution table—which may be used, e.g., for describing an execution (e.g., of an order or transaction) among a plurality of executions performed using embodiments of the invention. An example order execution summary table, entry or record is provided in Table 3:

TABLE 3

| Variable | Datatype | Example | Description |
|---|---|---|---|
| Package ID | Char | SMA-2023-11-15-13.39.15.055909 | Package id of the order |
| Order ID | Bigint | 6473690 | Order id for the order |
| Execution Price | Decimal | 87.5800000 | e.g., in US dollars |
| Number of Executed Shares | Decimal | 0.252 | (may be fractional) |

TABLE 3-continued

| Variable | Datatype | Example | Description |
|---|---|---|---|
| Trade Qty | Decimal | 0.252 | Number of shares on the order (e.g., according to the corresponding order database entry; in this example case the order was fully executed) |
| Status Code | Char | EXEC | Order status code, as, e.g., explained above |
| Create DateTime | Datetime | 2023-11-15 13:39:15.6266667 | Date/time at which order was created |
| Create User | Char | SMA | Id of the entity who created the order |
| Update DateTime | Datetime | 2023-11-15 13:39:20.2000000 | Date/time at which order was updated |
| Update User | Char | SMA | ID of the entity who updated the order |
| Settle Date | Date | 2023-11-17 | Settlement date or date the order was settled with a given provider (e.g., prior to execution) |
| Reason Text | Varchar | | Reasons/details which may be specified, e.g., if the order is rejected |
| Trade/execution Date | Date | 2023-11-15 | Trade/execution date may be given as a separate field |

In some embodiments, positions of inventory items or item types may be documented in a corresponding position or inventory position table or database—which may be used, e.g., for describing a position held using embodiments of the invention. An example position database, (or table) entry or record is provided in Table 4:

TABLE 4

| Column | Datatype | Example | Description |
|---|---|---|---|
| Account ID | Char(26) | 2002-02-14-21.57.17.675394 | Internal account or inventory id/number |
| Security ID | Char(9) | 0000DF6U1 | Security or item Identifier |
| Start of Day Available Qty | Decimal | 0.111 | Number of items or shares the inventory account was holding at start of a predetermined time period such as e.g., a single day |
| Start of Day Cost | Decimal | 87.41000 | Cost or value for all available items of the same type at start of the day |
| Start of Day Market Value | Decimal | 9.70 | Start of day market value for a unit of the given item |
| Available Qty | Decimal | 2.606 | Current available quantity |
| Create DateTime | Datetime | 2023-11-15 03:12:26.5603110 | time of creating record |
| Create User ID | Char(8) | MDABFT01 | Identifier of system/user creating the record |
| [IDN_CREAT_PGM] | Varchar(50) | MDABFT01 | Identifier for program creating the record |
| Update DateTime | DateTime | 2023-11-15 13:39:21.2166667 | time record was last updated |
| Update User ID | Char(8) | FTM | identifier for system/user updating the record |
| [IDN_UPDT_PGM] | Varchar(50) | P_FTM_ACCT_POS_SAVE-Z | identifier for program updating the record |
| Start of Day Average Cost | Decimal | 83.36670 | Average cost at start of day for a predetermined time period (e.g., a month) |
| Symbol | Char(9) | BFAM | Symbol for item or security |

TABLE 4-continued

| Column | Datatype | Example | Description |
| --- | --- | --- | --- |
| Security/Item Description | Varchar(60) | FAMILY SOLUT | |
| Pending Sell Qty | Decimal | 1.796 | Total quantities specified or required of the item in pending sell orders |
| Pending Replenish Qty | Decimal | 0.000 | Total quantities specified or required of the item in pending replenishment orders |
| Last Replenish OrderID | Varchar(64) | FTM_6473686_931 | Replenishment order id (e.g., according to the example replenishment database record provided herein) |

It should be noted that the example databases or tables provided herein should be considered nonlimiting, and that additional or alternative table or database formats may be used in different embodiments of the invention.

Some embodiments of the invention may perform inventory and/or position monitoring, tracking or maintenance and provide timely responses to requests and commands (such as for example sell, buy, and/or inventory check requests or calls from a plurality of users and/or resource consumers). In order to manage the throughput and correctness of such tracking, some embodiments may use or include a custom data structure, such as a dedicated sequence or queue data structure, which may define a priority or ordering for the events considered, which may be processed in accordance with inventory position updates (e.g., as may be described in corresponding data structures and monitored using automated actions as part of a corresponding algorithm or procedure such as for example described herein). Some embodiments of the invention may include a position topic interface and prioritizer component. In some embodiments, the prioritizer component may decide which orders, requests, or transactions to process on a priority basis.

Some embodiments of the invention may automatically organize or sort events, such as for example network requests or commands, in a queue—which may include assigning or determining priorities to requests, for example based on request types such as for example described herein.

In one nonlimiting example, replenishment orders may be assigned the highest priority, followed by sell inventory checks—since, e.g., as the system may be waiting to acquire inventory information in order to proceed with a subsequent sell order. Buy and/or sell executions, for example, may have an even lower priority, and finally liquidations out of the inventory account may have the lowest priority. Using priorities as part of some example embodiments of the invention is further demonstrated herein. It should be noted that alternative action priorities or action prioritizing schemes may be included and/or used as part of different embodiments of the invention. A rejection as used herein may refer to a case where an order or transaction may not be carried out. In some examples, a transaction may be rejected by the downstream systems (such as for example order management systems and/or execution venues) for various reasons, such as for example violating security policies and/or regulatory requirements. An order or transaction may be recognized or tagged as invalid after a rejection is made, and the order or transaction may be cancelled.

A bust as used herein may refer to a case where an order or transaction may get cancelled after the transaction is carried out, e.g., to undo the transaction. In some cases, the relevant order or transaction may become active following the bust and may be executed once more, e.g., with different conditions (such as for example a different market price). Traders or order management system admins may, in some example cases, bust an order and resubmit it for execution.

Some embodiments may ensure performing automated actions or transactions (such as for example executions/rejections/busts, and/or the various automated actions described herein) such that events are processed and/or executed according to priorities and/or in the same sequence as received. In some embodiments, this may be achieved, for example, using a dedicated queue or event processing system or platform, such as for example ones including or involving a plurality of Apache Kafka topics with multiple partitions (which may allow for example to send messages of one topic to multiple addresses or recipient components)—e.g., in order to achieve desired performance and scalability features (as known, e.g., in the arts of distributed event and stream processing; this may be for example carried out by the prioritizer component described herein). In this context, for example, a Kafka topic may be used to receive, e.g., a plurality of orders or transaction messages, requests and commands (which may be referred to, e.g., as an ORDER_REQUESTS topic), and a custom data structure may be used for representing messages within a topic (which, in some embodiments, may allow increasing throughput capacity by processing messages, requests, or commands in the order by which they are received). The data structure may be configured to be used in a blocking queue, which may be achieved, for example in requiring that it for example creates one blocking queue or queue item instance for each order at a time (such that, e.g., no two queue items, messages, events, or elements, may be created or inserted into the queue at the same time). It should be noted that various events or message queueing or organizing frameworks and techniques may be used in different embodiments of the invention.

Figure 3:
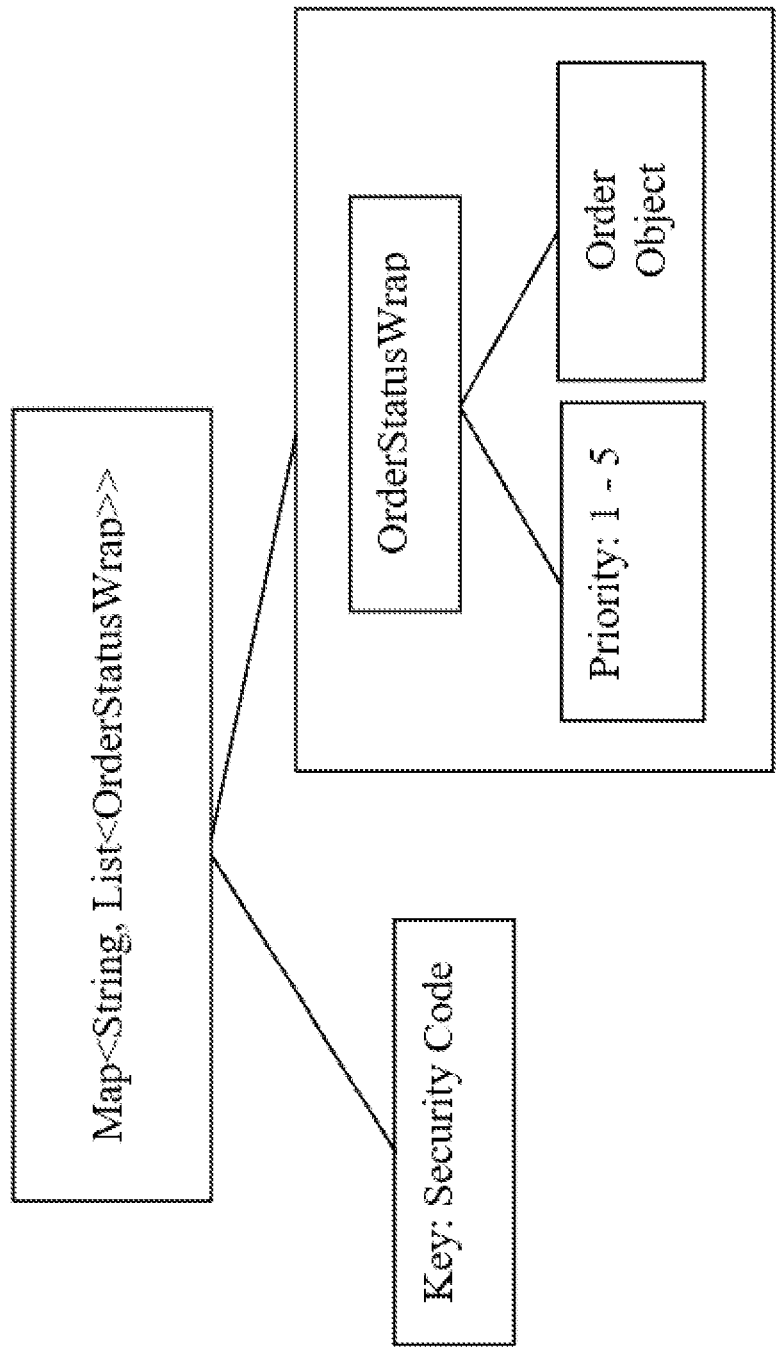
FIG. 3 shows an example priority sequence data structure according to some embodiments of the invention.

FIG. 3 shows an example priority sequence data structure according to some embodiments of the invention.

A nonlimiting nomenclature which may be considered in FIG. 3 may include or involve, e.g.:

OrderStatusWrap may refer to the name of a data object (and in some embodiments, to an Apache Kafka object), which may hold or include the priority value and an event or order object, or an event or order data for processing. An OrderStatusWrap object may contain a calculated priority value (e.g., 1-5) and an event or order object—which may contain the definition of an order and its details like quantity, item or security ID, and/or additional or alternative values described or included in the various relevant tables provided herein (such as for example the order summary table).

A map may be an object that links or associates keys with values, and list may generally be an ordered collection (which may also be referred to as a sequence). Map<String, List <OrderStatusWrap>> may be a data object which may hold or include multiple lists of OrderStatusWrap objects as values, and for example associated with a specific Security Code or Key (e.g., for managing access and preventing sensitive information from being accessed by an unauthorized party, as known in the art).

In some embodiments of the invention, a priority value may be mapped to an action, transaction or order category for example according to the following example rules:
1→Replenishment transaction executions.
2→New "sell" orders, inventory position checks.
3→All other actions or transactions (like bust, reject, cancel order, and the like).
4→Manual liquidation or replenishment requests.
5→Automatic liquidations based on, or associated with "buy" transaction executions Additional or alternative mappings may be used in different embodiments.

Events (which may be or may include, for example, computer action requests or commands such as, e.g., described herein) may generally be received and considered by some embodiments of the invention for example using a dedicated queue or Kafka topic corresponding to an event or action type (e.g., "order requests", "position value calculation/update", "position response" which may be an event of calculating or sending a position value to a requester and/or to an order management system or component, e.g., as part of the protocols or algorithms described herein, as well as additional or alternative events and corresponding topics or queues). In some embodiments of the invention, a queue or Kafka topic may have or include multiple, or a plurality of, partitions (such as, e.g., 24 partitions or threads, where each partition may send queue messages to one of 24 recipient systems or components) using a partition key which may be a securityID, and which may for example be used by an authorized party or system to ensure that all events for a given key or securityID may be included in a given partition and may be processed in the same sequence as received within the relevant queue.

One skilled in the relevant art would recognize that while in some example embodiments queuing and prioritizing protocols and procedures such as for example disclosed herein may be achieved using Apache Kafka topics (and, e.g., appropriate interfaces or APIs), different embodiments may be realized in which such queuing and prioritizing protocols may be provided using message queue (MQ) and/or representational state transfer (REST) tools and/or APIs. Additional or alternative queueing tools may be used in different embodiments of the invention.

Figure 4:
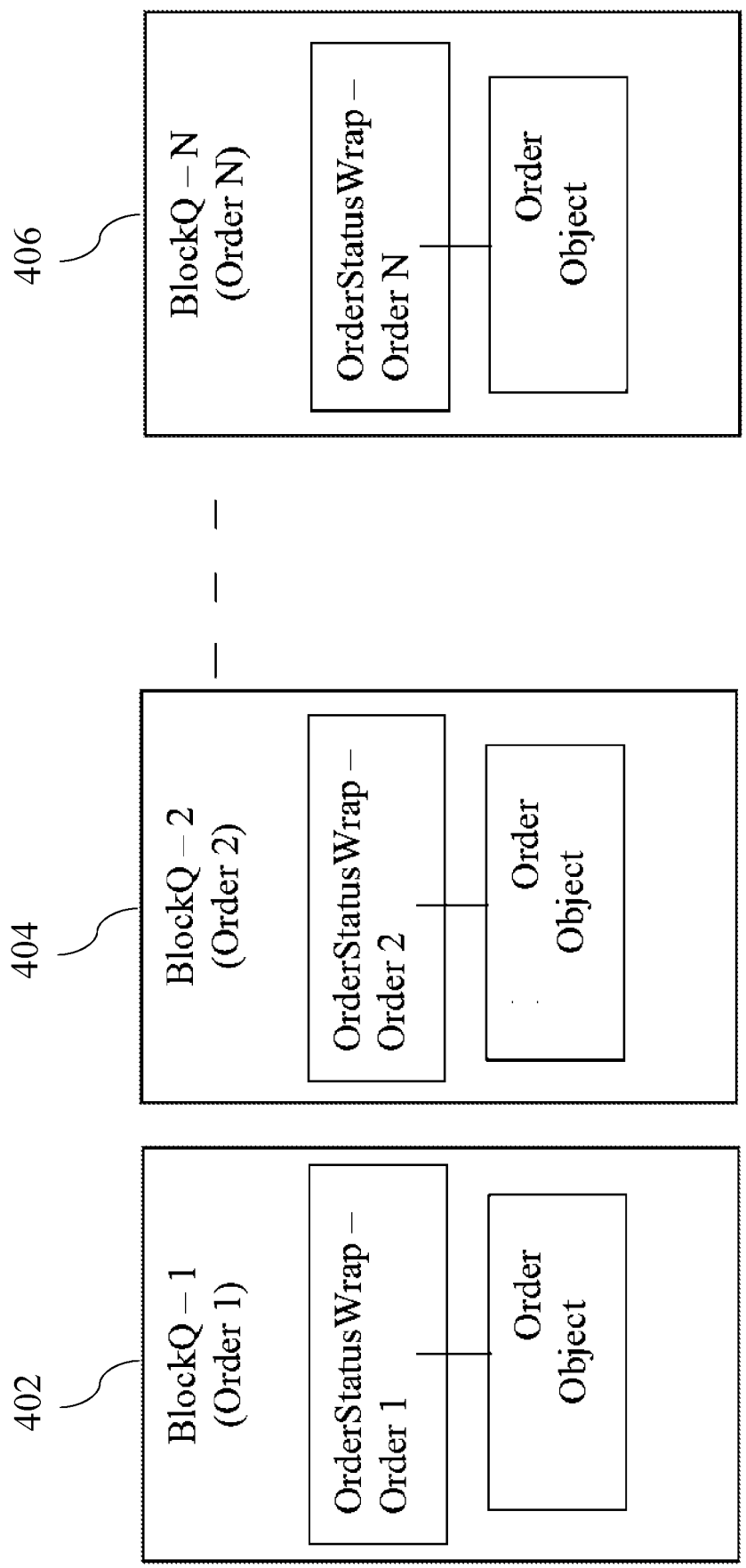
FIG. 4 shows an example event queue according to some embodiments of the invention.

FIG. 4 shows an example event queue according to some embodiments of the invention. An example message or event queue may be or may include, e.g., a Kafka topic which may correspond to a given type of messages or events (for example describing "replenishment transaction executions", "sell order inventory checks"- or more general event types such as "orders", "checks", and the like). Messages or events may be organized as "blocks" in the queue—for example according to the order in which they were created or received by embodiments of the invention. In such manner, a first created order (e.g., "order 1") may be placed as the first block ("BlockQ-1" 402) in the queue, followed by a second created order ("BlockQ-1" 404), and so forth, until the Nth block ("BlockQ-N" 406)—which may signify the last event currently present in the queue, and/or the last event to be processed among all in the queue under consideration. As further discussed herein, different queues and/or events may be assigned different priorities, such that, e.g., events present in a queue for "replenishment transaction executions" will always be processed before "manual liquidation or replenishment requests". It should be noted that different event queuing and prioritizing frameworks and/or representations may be used in different embodiments of the invention.

Embodiments of the invention may include or involve an event priority calculation algorithm. An example event priority calculation algorithm is provided in Algorithm 1 herein, provided in an example implementation using the Java programming language, and a corresponding example pseudocode:

---

Algorithm 1.

```
public static Integer calculatePriority (OrderStatusWrap
orderStatusWrap) throws Exception {
    IMProcessingContext compareThresholdContext = null;
    EquityOrder equityOrder = null;
    Integer priority = null;
if ( (compareThresholdContext=orderStatusWrap.getCompareThres
holdContext ( ) ) != null) {
if (Constants.YES.equals (compareThresholdContext.getIsAutoRe
plenisish ( ) )
        | |
compareThresholdContext.getManualReplenishOrder ( ) != null)
{
        // priority #1 - manual or SOD auto
replenishments
        priority =
ORD_SEQ_PRIORITY.FTM_BUY_ORDERS.getValue ( ) ;
    }
        else {
        // priority #4 - least priority - manual or
SOD/EOD auto liquidations
        // priority #5 is used for auto liquidations
due to accumulation; keep as #5 for easy management
        priority =
ORD_SEQ_PRIORITY.MAN_LIQ_RPLNSH.getValue ( ) ;
        }
    }
        else if ( (equityOrder=orderStatusWrap.getEquityOrder ( ) )
!= null) {
        if (isPositionCheckNeeded(equityOrder) ) {
            // priority #2 - sell inventory check requests
            priority =
ORD_SEQ_PRIORITY.INV_CHK_ORDERS.getValue ( ) ;
        }
        else
if (equityOrder.getMSWMBranchCode( ) .equals(Constants.APP_ID)
    &&
Side.BUY.getCode( ).equals(equityOrder.getSide( ) ) ) {
        // priority #1 - FTM buy drop copies
        priority =
ORD_SEQ_PRIORITY.FTM_BUY_ORDERS.getValue( );
        }
```

-continued

Algorithm 1.

```
        else {
            // priority #3 - any other drop copies
            priority =
    ORD_SEQ_PRIORITY.OTHER_ORD_REQS.getValue( );
        }
    }
    if(priority == null) {
        throw new Exception ("Invalid position update
request: " + orderStatusWrap);
    }
    return priority;
}
function calculatePriority (Order order) {
    if order object contains a replenish order execution, set
priority = 1;
        else if order object contains a inventory position check
request, set priority = 2;
        else if order object contains a manual liquidation order
or a manual replenishment order, set priority = 4;
            else if order object contains an auto liquidation order,
set priority = 5;
            else set priority = 3;
    return priority;
}
```

A "save positions" action or API may reserve or allocate the position value or quantity, if exists, in the inventory. Otherwise, if the requested quantity does not exist, a replenishment order may automatically be created and tracked as described herein. It should be noted that additional or alternative event priority calculation algorithms may be used in different embodiments of the invention.

The save positions API or module may also include a component or a function which may create or update the relevant inventory position value for a given inventory item or security, for example based on corresponding actions or transactions, and/or based on action or transaction types, such as for example described in Table 5:

TABLE 5

| Priority Value | Order Category | Save Positions Operation |
|---|---|---|
| 1 | Replenishment order execution | Increase position value for the relevant inventory item by the executed quantity value |
| 2 | New sell order inventory position check | Reserve (or lock) the requested quantity for the requested inventory item security |
| 3 | Busts, rejections, cancelations, and/or additional or alternative actions | Rejection/cancelation: release any reserved quantity of the relevant inventory item, e.g., in case of sell order. Bust: decrease a position value in case of a bust for a buy order or increase in case of a bust for a sell order Execution: increase the account position value in case of an execution of a buy order or decrease in case of sell order |
| 4 | Manual liquidation or replenishment requests | For a liquidation action or transaction: reserve (or lock) the requested quantity before sending for execution |
| 5 | Automatic liquidations based on buy order executions | Reserve (or lock) the requested quantity before sending for execution |

Additional or alternative protocols including different operations may be included or used in different embodiments of the invention.

It should be emphasized that while the Apache Kafka queuing and event processing framework (including the "save positions" API or module described herein) has been used herein to describe some example embodiments of the invention, one skilled in the art may recognize that additional or alternative frameworks, such as for example message queue (MQ), or representational state transfer (REST) may be used in different embodiments, for example using appropriate interfaces or APIs, to achieve or provide relevant queueing and prioritizing functions.

"Trade Along" Some embodiments of the invention may include or involve a computerized algorithm which may be, for example, responsible for:

Reserving or allocating inventory items and/or positions for sell requests, and liquidating items and/or positions based on executions.

Making sure inventory position values never go short.

Reducing "going to the market" or performing transactions, e.g., with broker systems or servers, for example to replenish or liquidate inventory.

Reducing the inventory, or number of shares or items included in the inventory, to minimize idle or unused inventory items and/or market risk to which the system or platform may be exposed holding redundant items.

Serving all incoming sell requests within a predetermined time period (such as, for example, of 300 milliseconds).

Allowing high throughput and supporting a plurality of simultaneous or parallel trades (e.g., thousands of transactions) within an appropriate time period (e.g., minutes).

Allowing additional, different trading systems and platforms to integrate with embodiments of the invention in a "Plug n Play" fashion, e.g., seamlessly and transparently as described herein.

Additional functionalities and/or components may be included in different algorithms included in different embodiments of the invention.

As further described herein, some embodiments of the invention may track a dedicated or auxiliary database, which may be, for example, a position database including inventory position values such as, e.g., described herein. In some embodiments, the tracking of the database may include comparing a requested amount or value (which may be describing, or associated with, a given request and command and may, e.g., be fractional) to a value in the auxiliary database (which may be for example an inventory position value, which may be, e.g., an "Available Qty" value such as for example provided in Table 4), and reserving or allocating a value or amount (which may for example equal or be smaller than the position value) of an inventory item based on the comparison and based on the priority of the request.

A nonlimiting example request data structure according to some embodiments of the invention is given in Table 6:

TABLE 6

| Field Name | Description | Example |
|---|---|---|
| MsgType | Type of the event message, e.g., indicating new order message or event | New Order |
| SendingTime | Message/request/event sending time | 2023-11-15 12:45:25.133 |
| ProgramChannel | Program from which the event or message is sent | ADVUMA |
| TimeOutInSecs | How long the request may be allowed to wait before being executed (in seconds) | 30 |
| EntityStatus | Order status - New (e.g., received today) | New |

TABLE 6-continued

| Field Name | Description | Example |
| --- | --- | --- |
| WMEventType | Type of the event | NewOrderAck |
| MSWMBranchCode | Branch code or identifier of the originating program | SMA |
| Side | Order type (e.g., 1 indicating buy and 2 indicating sell) | 2 |
| SecurityID | Item or security symbol | DHR |
| OrderQty | Order quantity or requested amount | 0.999 |
| WMClientClOrdID | Order id e.g., from client or event creating system | SMA_2023-11-15_000584562 |

Additional or alternative request formats or data structures may be included or used in different embodiments.

Figure 5:
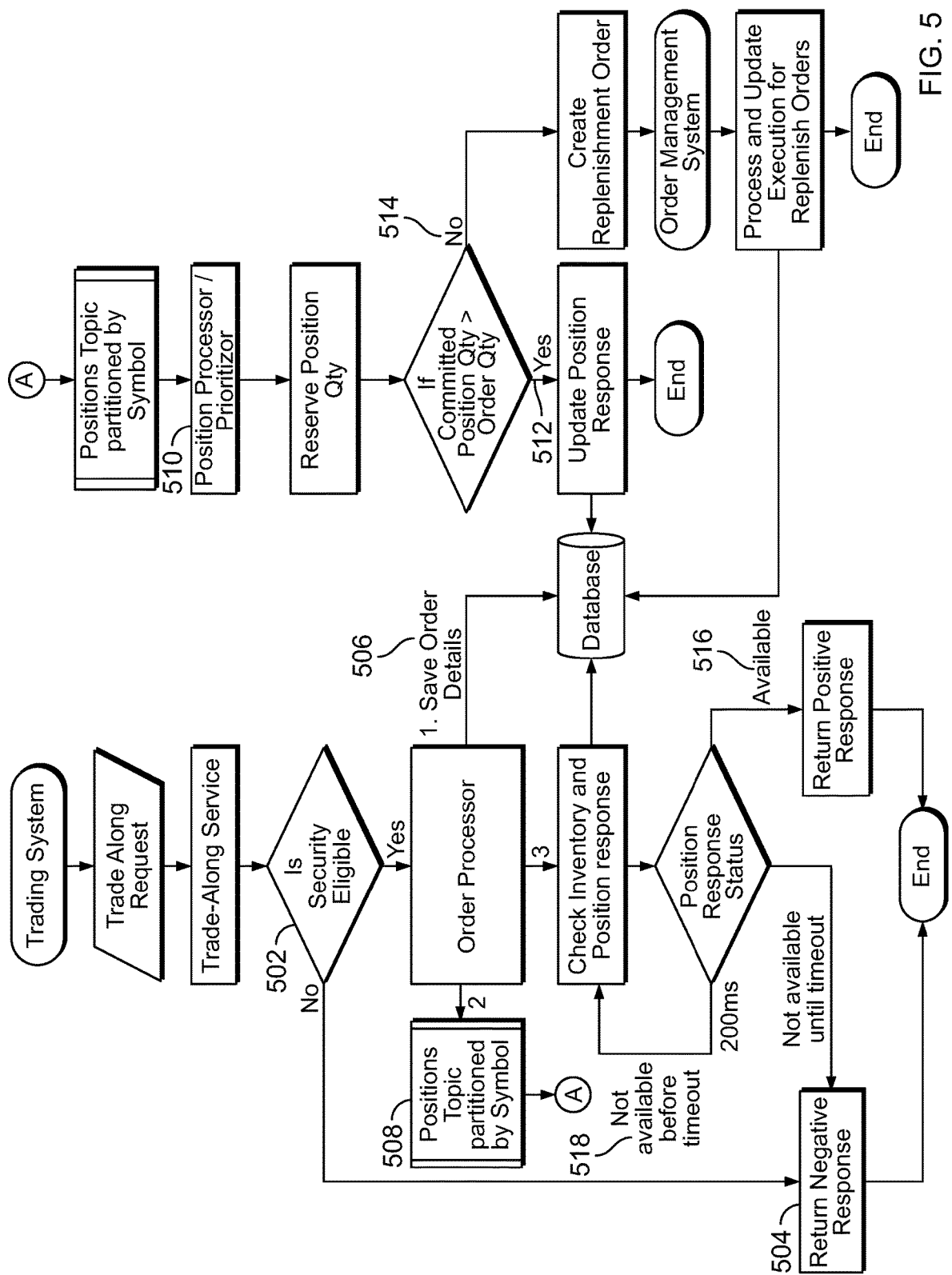
FIG. 5 shows an example process of network transaction management according to some embodiments of the invention.

Some embodiments may automatically attempt the executing requests or commands—for example based on the tracking of the auxiliary database and based on the queue and, e.g., within predefined time periods or timeframes from the tracking of the auxiliary database and/or from the receiving or from the queuing of the request or command (see for example further discussion with regard to FIG. 5 herein). If, however, a given request or command is not executed within the corresponding time period—embodiments may send or transmit an alert or notification to a requester computer which may be a user or remote computer associated with the relevant request. Some embodiments may ensure or require that requests or commands may be executed within a predefined time period, e.g., of 200 milliseconds or another period, from the tracking of the auxiliary database.

A nonlimiting example notification or alert format which may be used in some embodiments is provided in Table 7:

TABLE 7

| Field Name | Description | Example |
| --- | --- | --- |
| MsgType | Type of the event message, e.g., indicating a new order message or event | New Order |
| SendingTime | Message sending time | 2023-11-15 12:45:55.226 |
| ProgramChannel | Program from which the event message is sent | ADVUMA |
| EntityStatus | Order status - New | New |
| WMEventType | Type of the event | NewOrderAck |
| MSWMBranchCode | Branch code of the originating program | SMA |
| Side | Order type (e.g., 1 indicating buy and 2 indicating sell) | 2 |
| SecurityID | Item or security symbol | DHR |
| OrderQty | Order quantity | 0.999 |
| WMClientClOrdID | Order id from client or requester system | SMA_2023-11-15_000584562 |
| AvailQty | Number of units currently available in the system | 0.511 |
| SourceClOrdID | Respective replenishment order id (e.g., if AvailQty is insufficient or smaller than requested amount or OrderQty) | FTM_6473651_896 |
| ResponseStatus | Response status or state for request | FAILURE |
| ResponseDesc | Response description | Timeout in 30 seconds fpr Replenishment order(s): FTM_6473651_896 |
| PendingSellQty | Pending sell quantity | 0.999 |
| PendingBuyQty | Pending buy quantity | 1.000 |

Additional or alternative notification or alert formats may be used in different embodiments of the invention.

As further described herein, some embodiments may automatically perform some network based actions or transactions based on the automatic tracking of the auxiliary database.

Some embodiments may automatically perform exchanges of data (which may, e.g., referred to herein as a "first data exchanges", or transactions/exchanges of "a first type", among various additional exchanges of different types) with a plurality of remote computer systems, e.g., based on an excess value or amount calculated based on a requested amount and a corresponding value included in a corresponding database (which may be referred to herein as an "auxiliary database" used in some of the protocols or procedures described herein). In one nonlimiting example, given a buy request from a user U1 including or involving an inventory amount X of inventory item T1 (where X may be fractional)—if X exceeds (e.g., is larger than) an inventory position value Y for T1, then embodiments may automatically attempt, perform or execute replenishment transactions (e.g., with a plurality of corresponding broker servers), in the overall amount of (X–Y), or in the "excess amount" (or, for example if X is fractional, based on rounding the fractional amount upwards to result in a positive integer).

Some embodiments may automatically perform exchanges of data (which may be, e.g., referred to as "second data exchanges", or transactions/exchanges of "a second type", among various additional exchanges of different types) with a plurality of remote computer systems, e.g., based on a plurality of predetermined settings and/or thresholds. In one nonlimiting example, if at a predetermined time period or a given point in time (which may for example be set to, e.g., 19:00 o'clock or any other hour), an inventory position value for a given inventory item is a positive integer (e.g., equal to, or larger than 1)—embodiments may automatically attempt, perform or execute liquidation transactions (e.g., with a plurality of corresponding broker servers) based on the integer (e.g., for example such that the inventory position value may equal 0 after the transaction is performed or executed).

One skilled in the relevant arts would recognize that additional or alternative network transactions and/or automatic computer actions may be automatically executed by different embodiments of the invention based on the tracking of an auxiliary database such as for example described herein.

Some embodiments may automatically update or rewrite a plurality of corresponding databases such as for example the auxiliary database (which may be, in some embodiments, a position database such as e.g., described herein) and/or the request database and/or additional databases such as, e.g., described herein, based on automatically executed or performed transactions, requests, commands, and the like.

FIG. 5 shows an example process of network transaction management according to some embodiments of the invention.

Embodiments of the invention may receive a request (which may also be referred to as a "trade along request"), e.g., for a sell transaction specifying a fractional quantity of a given inventory item or security. The "trade along request" may include details like Security Code/identifier, number of shares, Order Id, Buy/Sell command or code, and the like, such as for example demonstrated herein.

The request may be received by a dedicated trade along service. For example, after verifying availability of mandatory attributes and/or access permissions for the request and/or the sender, the trade along service may check whether the input Security identifier is eligible for fractional trading (502). If the item or security is not eligible, or not defined as eligible for fractional trading, then the service may provide a negative response to the request (504).

If the item or security is eligible, then the service may use or communicate with an order processor component or module to save the order details from the received request in a corresponding database (506) and then input a message to the "positions topic" in a message queue such as for example described herein (508).

As noted herein, some embodiments of the invention may include a "positions topic" in a message queuing system which may be partitioned by symbol or inventor item or security identifier. In such manner, requests for a given item or security may be processed sequentially, e.g., one at a time, to ensure consistency and robustness of handling requests, performing necessary calculations, and avoiding errors. In some embodiments, a position processor component or module may assign priorities to different types of position update requests or messages, for example according to the protocols and procedures described herein (510). The position processor may then process requests according to the priority assigned to them (which may include, for example, first processing all messages or requests having the highest priority, then processing all requests having the second highest priority, and so on, although additional or alternative processing rules or schemes may be used in different embodiments).

As noted herein, network transaction management may include tracking a database—which may include comparing a request amount to a value in the database, where the value may for example be reserved based on the priority of the request.

In the nonlimiting example flow depicted in FIG. 5, the position processor may attempt to "lock" or reserve the position quantity (which may be, for example, a number of shares) as requested in the input request. It may check if there is a sufficient quantity of the relevant inventory item that may allow to satisfy the request—which may include for example checking if an "Available Qty" or "committed qty" value such as, e.g., provided in Table 4, is equal to or exceeds the requested quantity or the relevant value being tracked by embodiments of the invention. If a sufficient quantity exists, the position processor may update the position table (e.g., to reserve or lock the quantity) and order table (to indicate order may be executed) in the corresponding databases (e.g., such as provided in the nonlimiting example tables herein; 512). If a sufficient quantity does not exist, the position processor may create a replenishment order and send it to a corresponding order processor for execution (514). When such a replenishment order is executed, embodiments may update the position and order tables accordingly.

Following the checking of available positions or inventory item quantities, an order processor may then check a response from the position processor or topic (also referred to herein as a "position response"). Embodiments may proceed to perform additional operations and respond to the input request accordingly. For example, if the requested quantity is available (e.g., as found in 512), embodiments may "lock" or reserve the requested quantity, and send or transmit a positive response to the request (516). If, on the other hand, the requested quantity is unavailable, embodiments may wait for a first predetermined time period (such as for example 200 milliseconds) before checking again whether the quantity is available (e.g., which may be the case following the execution of replenishment orders and a corresponding updating of the positions database; 518).

In some embodiments, if the executing of the requests and/or corresponding automated actions is not performed within the predefined time period, a notification may be sent or transmitted, e.g., to the relevant requester computer systems. For example, subsequent checks and waiting periods such as, e.g., described herein, may follow until a second predetermined time period or a timeout period is reached (which may amount to, e.g., 30 seconds). If the requested quantity is not available by the timeout period, an error message or negative response to the request may be sent (504).

It should be noted that additional or alternative workflows and/or operations may be used or included in different embodiments of the invention.

Figure 6:
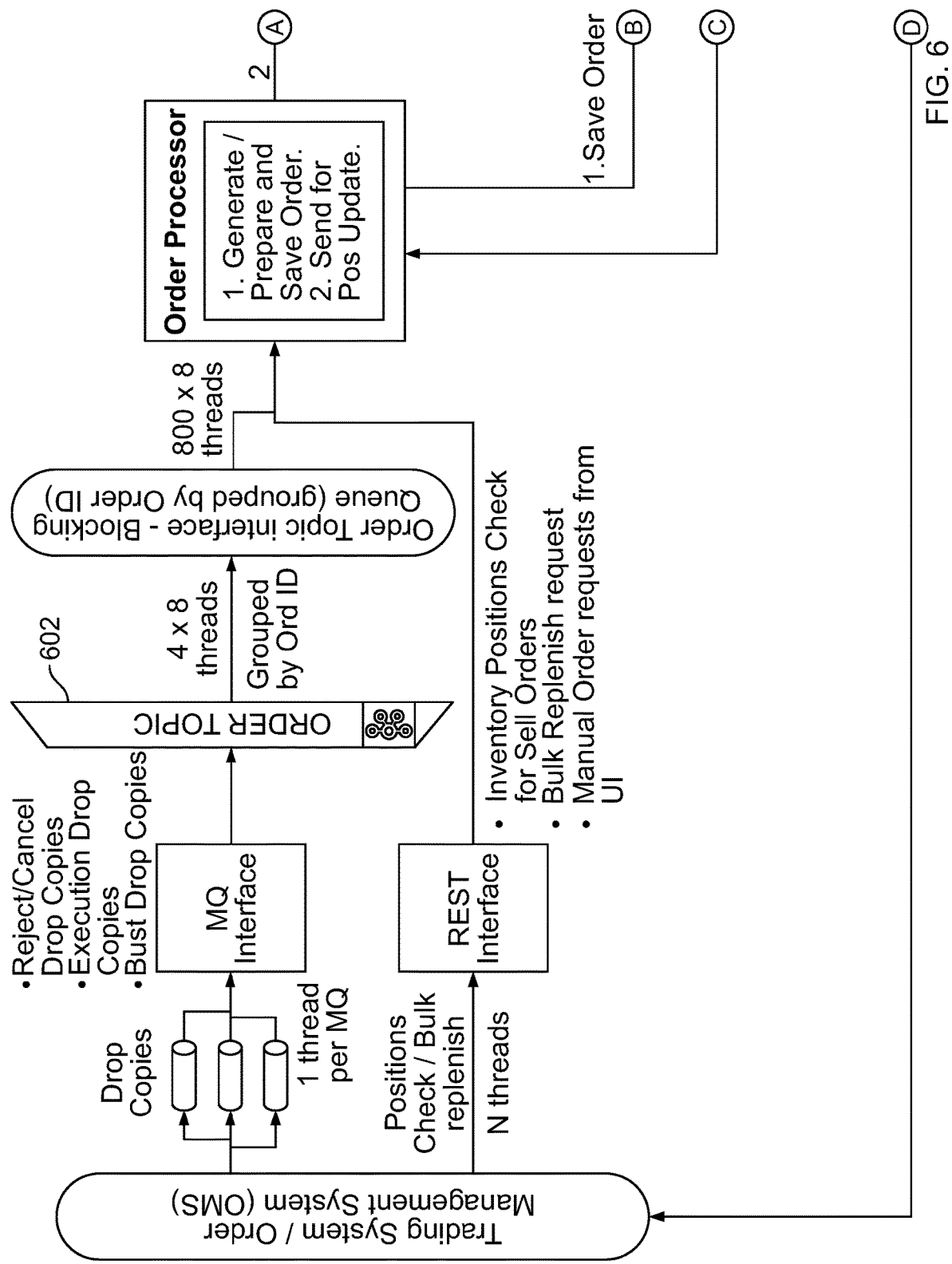
FIG. 6 shows an example network transaction management workflow between different system components according to some embodiments of the invention.
Figure 6:
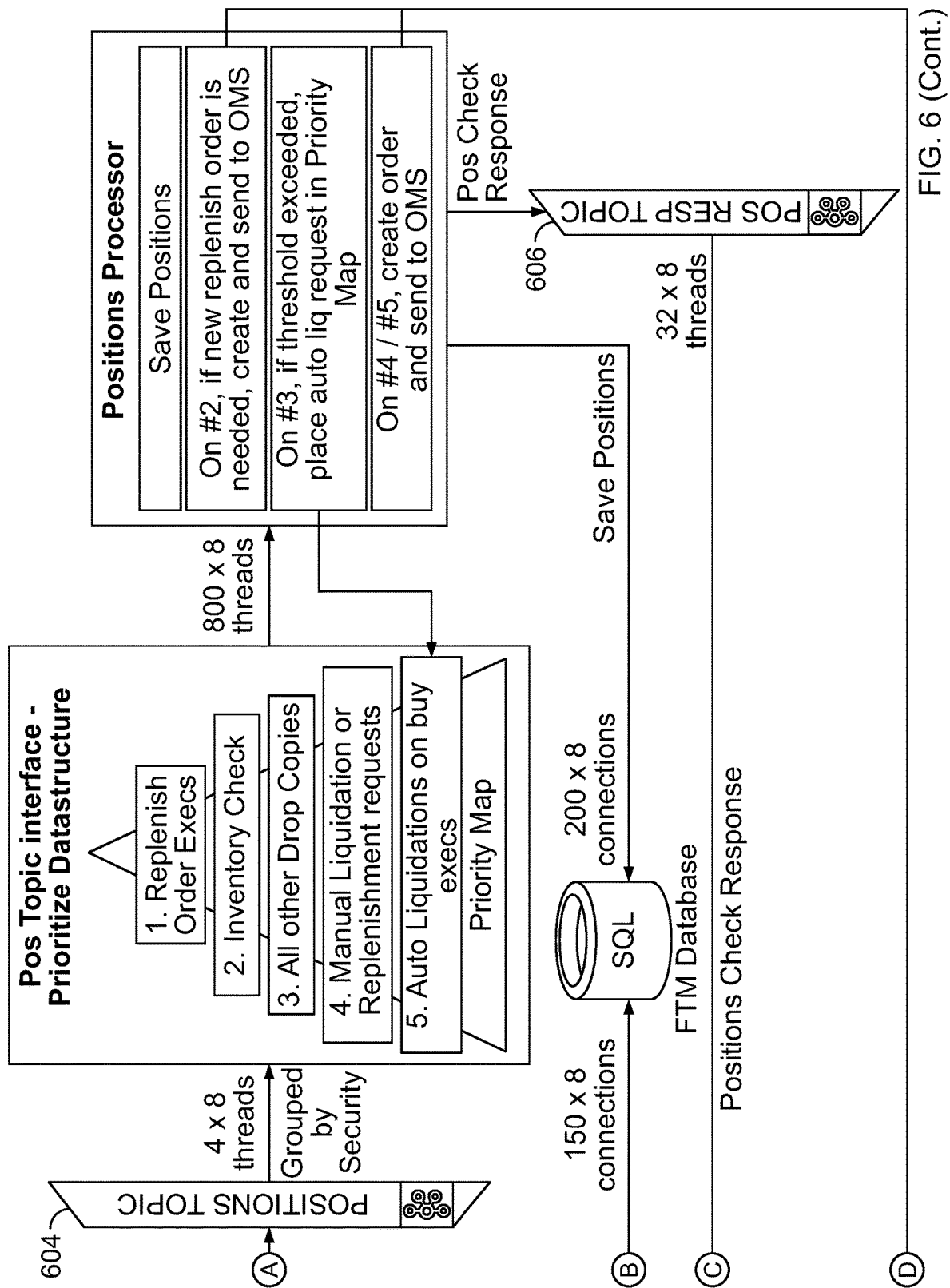

FIG. 6 shows an example network transaction management workflow between different system components according to some embodiments of the invention.

In some embodiments, some external systems or platforms (such as, e.g., a trading platform) may communicate with a fractional trading system or platform (e.g., according to some embodiments of the invention as discussed herein), and may send or transmit an order to sell or buy fractional quantity of a given item or security.

For "buy" orders or transactions, embodiments of the invention may round up the quantity to a whole number (e.g., in case only whole unit orders may be executed from providers, such as for example discussed herein). Embodiments may manage orders and/or generate, send, or provide order request and/or execution copies (which may be or may include "drop copies" or trade reports, e.g., according to a regulatory standard, as known in the art) once an order is executed, for example using a message queue (MQ) interface such as for example described herein. For example, in case orders are rejected, canceled, or busted—embodiments may generate and/or send the respective reports, notifications, alerts or messages using MQ interface to the relevant external system, platform, or service.

Embodiments may process orders by "sequentializing" or organizing them, e.g., in Kafka "order" topic or topics 602—which may for example include or have 4 (topics or order types)*8 (partitions or threads for each topic)=32 total partitions or threads (topics and partitions may be made, e.g., according to an Order Id such that for example certain identifiers may be assigned to a given thread, and other identifiers to a different thread).

By using queues or blocking queues such as for example described herein, different orders and/or order types may be assigned larger number of threads to increase throughput and/or handling the relevant orders or order types (in one example, replenishment order executions may be assigned several partitions or threads, such that, e.g., executions may not be delayed by being placed in a single queue or partition and being forced to follow one another; additional or alternative examples may be realized).

In some embodiments, each partition or thread may invoke an order processor to save or document the order in a corresponding database (such as for example one or more of the relevant databases described herein), and send a message to "positions" topic 604, which may be responsible for position value calculations or updates, e.g., based on managing inventory items such as for example described herein (e.g., ones that are to be bought according to the order request).

Similarly, in some embodiments of the invention, an external system or platform (such as, e.g., a trading platform) may send a "sell" request or command via a REST API or interface. The REST API may invoke the order processor to save the order in database and then send a message to positions topic 604 for updating the relevant position value (e.g., following the reserving of an inventory item for the relevant "sell" action or transaction).

As discussed herein, a positions Kafka topic 604 may be partitioned by item or security identifiers, e.g., to make sure all the messages for a given security are processed in the same sequence as received. Using the same example, there may be 32 partitions and hence 32 order "consumers" or threads, e.g., for different items, items types, orders, or order types—although additional or alternative partitions or consumer flows may be used in different embodiments.

"Consumers" or threads of events or orders may prioritize different events or orders, and process events according to the priority determined or assigned to them, and e.g., using an appropriate or custom data structure such as for example described herein.

In some embodiments, there may be additional threads (such as for example as many as 6,400 threads) that may read from the priority or prioritized data structures—for example in parallel—in order to provide high throughput for handling large numbers or volumes of events and avoiding errors and slow handling of pending tasks.

As noted herein, network transaction management may include tracking a database—which may include comparing a request amount to a value in the database, where the value may be reserved based on the priority of the request. In some embodiments, threads or events may invoke or trigger a corresponding position processor to determine, calculate, save, reserve, or update position values, for example in an appropriate database or databases such as for example described herein—and/or to perform automated actions based on the determined priority.

Based on the various protocols described herein (see also discussion with reference to FIG. 5) embodiments may check if a request amount exceeds a corresponding value (e.g., an inventory position value such as for example provided in the tables herein), and accordingly automatically perform one or more data exchanges of a first exchange type (such as for example replenishment transactions), with remote provider computer systems based on an excess amount, and/or update, by the processor, the database based on the exchanges. Additionally or alternatively if, at a predetermined time, the relevant value is a positive integer, embodiments may automatically perform one or more data exchanges of a second exchange type (such as for example liquidation transactions), with one or more of the provider computer systems (e.g., execution venues) based on the integer.

In some embodiments, depending on type of event or message, the positions processor may take respective action, such as for example:

Priority #1: for a replenishment order execution event or message, it may update the positions in position table and then puts a message in position response topic 606 for the order processor to respond back to an inventory check call (as the order processor may be waiting for the position to be made available, such as for example in accordance with the algorithm and/or protocols and procedures for inventory management described herein).

Priority #2: for inventory check messages, it may check if there is a sufficient position quantity available in a corresponding database (such as for example a position table) which may be reserved for a corresponding event or order. If such a quantity is available, then that quantity may be locked/reserved and a corresponding event or message may be put or placed in position response topic 606, e.g., for the order processor to respond back to a corresponding inventory check call (as the order processor may be waiting for the position to be made available, for example in accordance with the algorithm and/or protocols and procedures for inventory management described herein). If the quantity is not available, then the position processor may create a replenishment order and send it for execution to the order processor or order management system. The inventory check may wait for that order to get executed in market to make positions available, such that the relevant quantities may be reserved such as for example discussed with reference to the various protocols and procedures described herein. Upon the generating of an order execution message it may be assigned a priority #1, or the highest priority, such as for example described herein.

Priority #3: For buy order executions and/or cancel and/or busts events, the positions processor may accordingly update the position in database table, such as for example described herein. In some embodiments, following a position value update, if the position value or quantity exceeds a predetermined threshold, then the position processor may automatically initiate sell/liquidation order or event, e.g., to reduce market exposure associated with the given inventory item or security. Such auto liquidations requests may be assigned a priority #5, or the lowest priority, such as for example described herein with reference to the prioritized or custom data structure.

Priority #4 and Priority #5: For manual liquidation and manual replenishment messages or events, (which may be received, for example, by an administrator or analyst, via a user interface) and/or auto liquidation messages, the positions processor may create a respective order and send to order processor or management system for execution. It should be noted that additional or alternative components and/or modules, including for example different APIs and interfaces—as well as additional or alternative procedures and protocols for event and/or order management and/or execution, may be included or used in different embodiments of the invention.

Embodiments may provide or distribute and/or manage inventory or inventory items while adhering to high performance and throughput standards, while optimizing inventory holdings and positions. Based on for example the protocols and procedures described herein, embodiments of the invention may allow for achieving a highly optimized inventory—for example with minimal market or risk exposure: as discussed herein, embodiments may optimize the number of shares to hold in an inventory, for example, to reduce market exposure while keeping sufficient quantities that may be provided to users.

Some embodiments may include performing bulk replenishments actions or transactions, where for example two or more transactions or exchanges of data may be automatically attempted, performed or executed in a single batch. For example, in some embodiments, automatic replenishments may be performed by bundling up multiple replenishments into one batch or bulk, such that those can be bought at one shot from, e.g., a broker server or system—and in order to reduce network traffic and optimize system performance.

Some embodiments of the invention may provide reports or summaries complying with regulatory requirements. For example, some embodiments of the invention may automatically generate, and send or transmit a Volker report to a request or command sender (such as for example a computer system remotely connected to embodiments of the invention over a communication network) such as for example provided in Table 8:

TABLE 8

| Field Name | Description | Example |
|---|---|---|
| BUSINESS_DATE | Trade Date | 2023-12-20 |
| DATA_SOURCE | Trade Source | WM_PnL_Attribution |
| DESK_NAME | Trading Desk | EQ & FI TRADING |
| REGION_NAME | Region | AMERICAS |
| COMP_PNL | Total profit and loss, by the end of a given day (which may be attributed to EXISTING_POSITIONS + NEW_POSITIONS) | −7898.842401 |
| EXISTING_POSITIONS | Profit and loss till the end of last trade day | −1098.525574 |
| NEW_POSITIONS | Net profit and loss attributable to new positions resulting from the current day's trading activity | −6800.316827 |

It should be noted that additional or alternative reports and report formats may be used in different embodiments of the invention.

Some embodiments may reduce intra-day exposure to risk, such as, e.g., risk associated with value fluctuations of assets held in the inventory, for example by automatically liquidating positions higher than an intra-day threshold. By the end of a predefined time period, such as for example the end of a day (EOD), embodiments may reduce the exposure further by automatically liquidating positions higher or equal to, for example a threshold of 1 share, thus making sure that excessive or redundant items or positions are held at EOD.

Some embodiments may ensure that inventory position values never go short via the customized algorithm implemented in the prioritizer as further described herein.

By providing bulk replenishment capabilities, some embodiments of the invention may reduce the overall number of transactions executed by the system, as well as fees or additional costs that may be associated with them.

Based at least on the protocols and procedures disclosed herein, some example embodiments of the claimed invention may offer at least the following technological improvements over previous system and methods:

An automated solution which may ensure no trading rules-of-thumb (such as, e.g., inventory positions value going short, etc., as described herein) are broken or breached.

Centralized, real-time trading capabilities which may allow rounding up and performing a sum or product of a plurality fractional orders by providing and tracking an inventory position value, and by taking automated actions accordingly.

Optimized automatic inventory replenishment and liquidation actions, e.g., to increase throughput and lower computational cost.

An automated and scalable solution which may be offered across different channels and/or integrated with existing systems (such as for example further described herein).

Automated replenishments and liquidations which may allow to optimize or minimize intraday and end-of-day market or risk exposure while maintaining optimized positions needed for throughput.

Supporting various transaction types such as, e.g., both BUY and SELL transactions, under a single technological framework such as for example described herein.

Complying with rules and regulations (including, for example Volcker rules and/or additional or alternative trading rules and regulations), and allowing for the generating of reports, e.g., to conform to relevant rules and regulations.

Automatically ensuring or verifying no short selling is taking place.

Automatically ensuring trades may be performed or reported within, or under predetermined time periods, such as, e.g., 10 seconds—which may allow for, e.g., both optimizing user experience and hardware system functioning.

Embodiments of the claimed invention may thus offer improvements over previous technology, systems and methods in which, e.g.:

A specific solution is not scalable across different channels.

Only buy transactions are supported.

Positions are held, kept, or tracked in a dedicated, separate account or inventory account, which is not liquidated automatically and/or in real-time, thus increasing risk or market exposure.

There is no inherent compliance with regulatory reporting requirements.

It should be noted that additional or alternative technological improvements may be offered by different embodiments of the invention, e.g., according to the contents of the present disclosure.

Figure 7:
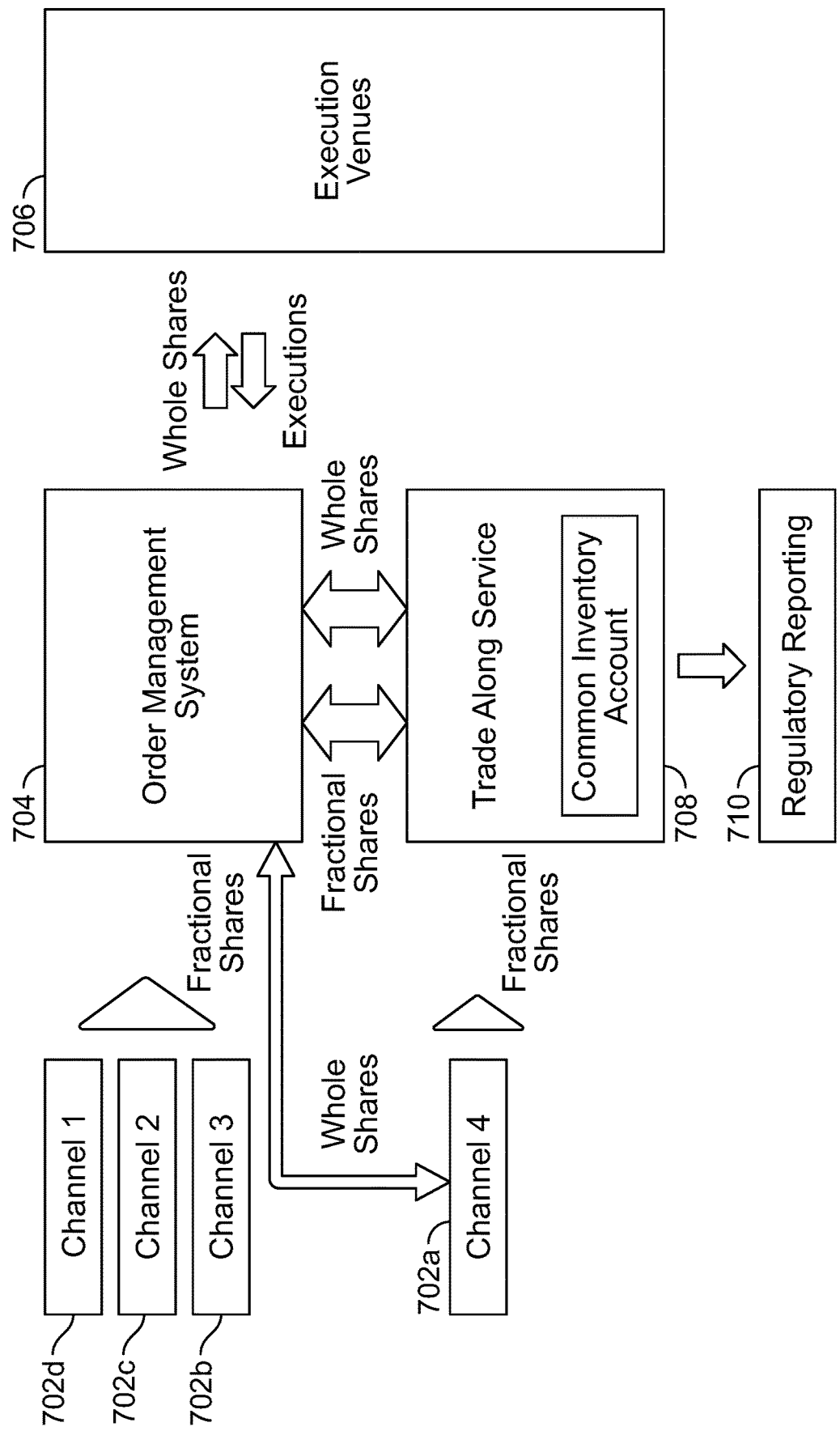
FIG. 7 presents an example multi-channel network transaction management system according to some embodiments of the invention.

FIG. 7 presents an example multi-channel network transaction management system according to some embodiments of the invention. Embodiments may be integrated with any suitable, or a plurality of, computational trading systems or applications to provide fractional trading capabilities, e.g., according to the protocols and procedures described herein. Channels as referred to herein may be or may include systems or platforms which may generate, send or transmit requests and/or commands (such as, e.g., orders in whole fractional units) to a fractional management or trading system according to different embodiments of the invention such as for example described herein.

In one example, a plurality of channels 702*a-d* may send orders to an order management system 704. The order management system may send the order and/or its contents to corresponding execution venues 706 (e.g., item providers) to execute the relevant actions or transactions (and, e.g., acquire requested items). To support fractional management or trading, trade along service 708—which may perform or include some or all of the protocols and procedures considered herein—may be integrated or incorporated into the system in two different ways, such as for example:

A given channel (such as for example channel 4, 702*a*) may send a fractional order directly to trade along service to provide an available position or inventory item quantity or value back to the relevant channel. The channel may then round up the order to a whole number and send that rounded up order to order management system 704.

A given channel (such for example channel 1 or 2 or 3; 702*b*, 702*c*, 702*d*) may send a fractional order to the order management system, which may in turn contact or trigger trade along service. Trade along service 708 may then calculate or check, and send or provide a position or inventory item quantity or value. Based on the response and corresponding value, order management system 703 may round up the order to a whole number and may execute it in relevant execution venues.

In some embodiments, trade along service 708 may be integrated or combined with order management system 704, such that it may receive and process requests and/or orders (such as for example replenishments or liquidations) and maintain an optimum level of inventory positions such as for example described herein. Trade along service 704 may also be integrated or combined with a regulatory reporting system or module 710, e.g., to provide data relevant for various types of regulatory reports, and to automatically generate reports such as for example described herein.

It should be noted that different system components and integration schemes and/or workflows, including different channels and/or modules, may be included or used in different embodiments of the invention.

Some embodiments of the invention may be applied to multiple channels—which may be or may include different existing external components, system, or platforms such as for example different trading platforms or programs relating to different inventory items and/or order or transaction execution frameworks or operations (e.g., "retail", "stocks", and so forth).

Figure 8:
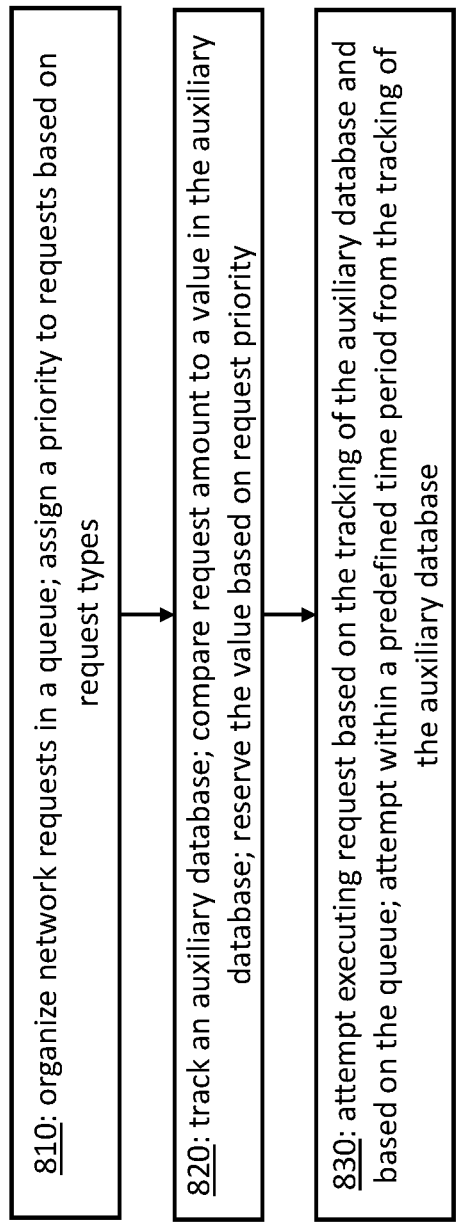
FIG. 8 is a flowchart depicting an example computerized method of exchanging data over a communication network according to some embodiments of the invention.

FIG. 8 is a flowchart depicting an example computerized method of exchanging data over a communication network according to some embodiments of the invention. In step 810, embodiments may automatically organize a plurality of network requests in a queue, where requests may be received over a communication network from e.g., remote requester computer systems and where requests may include data structures and/or tables such as described herein—and where the organizing may include, e.g., assigning or determining a priority to one or more of the requests based on request types. In some embodiments, requests or commands may include a requested automated action or transaction, such as for example a liquidation or replenishment action, and/or additional or alternative actions or commands, e.g., by a user, such as demonstrated herein. Embodiments may then track a database or auxiliary database, where the tracking may include, e.g., comparing a request amount to a value in the auxiliary database, and where the value may be reserved based on the priority of the request (step 820). Embodiments may then automatically attempt the executing (e.g., perform an exchange of data, or send or transmit requests or command data items over the communication network, and/or receive data items such as for example described herein) of one or more of the requests and/or corresponding automated actions, e.g., based on the tracking of the auxiliary database, and based on the queue, where the attempting of requests may be performed within a predefined time period from the tracking of the auxiliary database (step 830). One skilled in the relevant art would recognize that additional or alternative methods or processes, including additional or alternative steps or operations, may be included in different embodiments of the invention.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method of exchanging data over a communication network, the method comprising, using a computer processor:
   assigning, by the processor, a priority to one or more of a plurality of network requests in a queue based on a request type, wherein one or more of the requests are received over a communication network from one or more remote requester computer systems;
   tracking, by the processor, a database, the tracking comprising comparing a request amount to a first value in the database, wherein the first value is reserved based on the priority of the request;
   automatically attempting, by the processor, the executing of one or more of the requests based on the tracking of the database and based on the queue, the requests executed over the communication network, wherein the attempting is performed within a predefined time period from the tracking of the database;
   if the request amount exceeds the first value, automatically performing, by the processor, one or more first data exchanges, the first exchanges of a first exchange type, with one or more remote provider computer systems based on an excess amount, the one or more first exchanges performed over the communication network; and
   updating, by the processor, the database based on the one or more first exchanges.

2. The method of claim 1, wherein the predefined time period is 200 milliseconds, and wherein the method comprises:
   if the executing of the requests is not performed within the predefined time period, transmitting, by the processor, a notification to at least one of the requester computer systems, the transmitting performed over the communication network.

3. The method of claim 1, comprising:
   if, at a predetermined time, the first value is a positive integer, automatically performing, by the processor, one or more second data exchanges, the second exchanges of a second exchange type, with one or more of the provider computer systems based on the integer.

4. The method of claim 1, wherein two or more of the first exchanges are executed in a single batch.

5. The method of claim 3, wherein the plurality of requests are included in at least one request database, wherein the at least one request database and the database are SQL databases, and wherein the method comprises:
   updating the at least one request database and the database based on the performing of the one or more first exchanges and second exchanges.

6. The method of claim 1, wherein the request amount is fractional.

7. The method of claim 1, wherein the queue includes one or more Apache Kafka topics.

8. A computerized system for exchanging data over a communication network, the system comprising:
   a processor; and
   a memory;
   wherein the processor is to:
   assigning a priority to one or more of the requests based on a request type, wherein one or more of the requests are received over a communication network from one or more remote requester computer systems;
   track a database, the tracking comprising comparing a request amount to a first value in the database, wherein the first value is reserved based on the priority of the request;
   automatically attempt the executing of one or more of the requests based on the tracking of the database and based on the queue, the requests executed over the communication network, wherein the attempting is performed within a predefined time period from the tracking of the database;
   if the request amount exceeds the first value, automatically perform one or more first data exchanges, the first exchanges of a first exchange type, with one or more remote provider computer systems based on an excess amount, the one or more first exchanges performed over the communication network; and
   update the database based on the one or more first exchanges.

9. The system of claim 8, wherein the predefined time period is 200 milliseconds, and wherein the processor is to:
   if the executing of the requests is not performed within the predefined time period, transmit a notification to at least one of the requester computer systems, the transmitting performed over the communication network.

10. The system of claim 8, wherein the processor is to:
    if, at a predetermined time, the first value is a positive integer, automatically perform one or more second data exchanges, the second exchanges of a second exchange type, with one or more of the provider computer systems based on the integer.

11. The system of claim 8, wherein two or more of the first exchanges are executed in a single batch.

12. The system of claim 10, wherein the plurality of requests are included in at least one request database, wherein the at least one request database and the database are SQL databases, and
    wherein the processor is to: update the at least one request database and the database based on the performing of the one or more first exchanges and second exchanges.

13. The system of claim 8, wherein the request amount is fractional.

14. The system of claim 8, wherein the queue includes one or more Apache Kafka topics.

15. A method of performing fractional transactions over a data network, the method comprising, using a computer processor:
    determining, by the processor, a priority to one or more of the commands based on a command type, wherein one or more of the commands are received over a data network from one or more remote requester computer systems;
    monitoring, by the processor, a database, the monitoring comprising comparing a command amount to a first value in the database, wherein the first value is allocated based on the priority of the command, wherein the command amount is fractional; and
    automatically attempting, by the processor, the executing of one or more of the commands based on the monitoring of the database and based on the queue, the commands executed over the data network, wherein the attempting is performed within a predefined time period from the tracking of the database;
    if the command amount is larger than the first value, automatically performing, by the processor, one or more first network transactions, the first transactions of a first transaction type, with one or more remote provider computer systems based on an excess amount, the one or more first exchanges performed over the data network; and updating, by the processor, the database based on the one or more first transactions.

16. The method of claim 15, comprising:

if, at a predetermined time, the first value is a positive integer, automatically performing, by the processor, one or more second network transactions, the second transactions of a second transaction type, with one or more of the provider computer systems based on the integer.

17. The method of claim 15, wherein the queue includes one or more Apache Kafka topics, wherein each of the topics includes multiple partitions.

* * * * *